United States Patent
Pilcher

(10) Patent No.: US 11,035,144 B2
(45) Date of Patent: Jun. 15, 2021

(54) COLLAPSIBLE HUNTING BLIND

(71) Applicant: Henry Dale Pilcher, Winter Haven, FL (US)

(72) Inventor: Henry Dale Pilcher, Winter Haven, FL (US)

( * ) Notice: Subject to any disclaimer, the term of this patent is extended or adjusted under 35 U.S.C. 154(b) by 0 days.

(21) Appl. No.: 16/689,826

(22) Filed: Nov. 20, 2019

(65) Prior Publication Data
US 2020/0157834 A1 May 21, 2020

Related U.S. Application Data

(60) Provisional application No. 62/770,347, filed on Nov. 21, 2018.

(51) Int. Cl.
*E04H 15/00* (2006.01)
*E04H 15/28* (2006.01)
*A01M 31/02* (2006.01)

(52) U.S. Cl.
CPC ......... *E04H 15/001* (2013.01); *A01M 31/025* (2013.01); *E04H 15/28* (2013.01)

(58) Field of Classification Search
CPC ..... E04H 15/001; E04H 15/28; A01M 31/025
See application file for complete search history.

(56) References Cited

U.S. PATENT DOCUMENTS

| | | | | |
|---|---|---|---|---|
| 373,378 A | * | 11/1887 | Rumrille | E04H 15/28 135/98 |
| 941,458 A | * | 11/1909 | Leach | E04H 15/28 135/98 |
| 4,284,095 A | * | 8/1981 | Norton | A45B 25/14 135/21 |
| 4,364,193 A | * | 12/1982 | Visco | A01M 31/025 135/901 |
| 4,449,542 A | * | 5/1984 | McSwain | A01M 31/00 135/16 |
| 4,458,707 A | * | 7/1984 | Lindaman | A45B 25/18 135/16 |
| 4,505,286 A | * | 3/1985 | Madion | A01M 31/02 135/117 |
| 4,739,785 A | * | 4/1988 | Poulson | E04H 15/001 135/117 |
| 4,825,578 A | * | 5/1989 | Robinson | A01M 31/025 135/90 |
| 5,214,872 A | * | 6/1993 | Buyalos, Jr. | A01M 31/00 135/75 |
| 5,630,439 A | * | 5/1997 | Hutto | E04H 15/001 135/90 |
| 5,664,595 A | * | 9/1997 | Vonderhorst | A45B 3/00 135/15.1 |

(Continued)

*Primary Examiner* — David R Dunn
*Assistant Examiner* — Danielle Jackson
(74) *Attorney, Agent, or Firm* — Stephen H. Hall; Bradley Arant Boult Cummings LLP

(57) ABSTRACT

A collapsible hunting blind is provided. The collapsible hunting blind comprises a collapsible canopy having a shaft, an arm, a clamp, and a curtain configured to be draped over the canopy. The canopy is collapsible to provide ease of movement. The canopy and shaft are adjustable and rotatable to provide protection against sun, wind, or rain. The collapsible hunting blind may be affixed either to the ground or to a tree. The collapsible hunting blind camouflages a hunter.

13 Claims, 12 Drawing Sheets

(56) References Cited

U.S. PATENT DOCUMENTS

| | | | | |
|---|---|---|---|---|
| 5,692,720 | A * | 12/1997 | Griggs | A45B 23/00 135/15.1 |
| 7,264,011 | B2 * | 9/2007 | Cohen | A45B 11/00 135/20.1 |
| 7,431,041 | B2 * | 10/2008 | Wu | A45B 25/20 135/21 |
| 7,559,334 | B2 | 7/2009 | Cooper | |
| 7,828,003 | B2 * | 11/2010 | Montecucco | A01M 31/025 135/98 |
| D655,774 | S * | 3/2012 | Novak | D21/839 |
| 8,201,571 | B1 * | 6/2012 | Smith | E04H 15/001 135/90 |
| 8,381,749 | B1 * | 2/2013 | Ashmore, Jr. | E04H 15/04 135/96 |
| 9,593,903 | B1 * | 3/2017 | Sanchez | F41B 5/1453 |
| 10,285,397 | B2 * | 5/2019 | Swanson | A01M 31/02 |
| 2002/0036007 | A1 * | 3/2002 | Sellers | E04H 15/04 135/90 |
| 2005/0011134 | A1 * | 1/2005 | Boltan | E04H 15/003 52/3 |
| 2006/0076043 | A1 * | 4/2006 | Talley | E04H 15/28 135/98 |
| 2006/0102216 | A1 * | 5/2006 | You | E04H 15/28 135/90 |
| 2019/0357644 | A1 * | 11/2019 | Aceituno | E04H 15/28 |

* cited by examiner

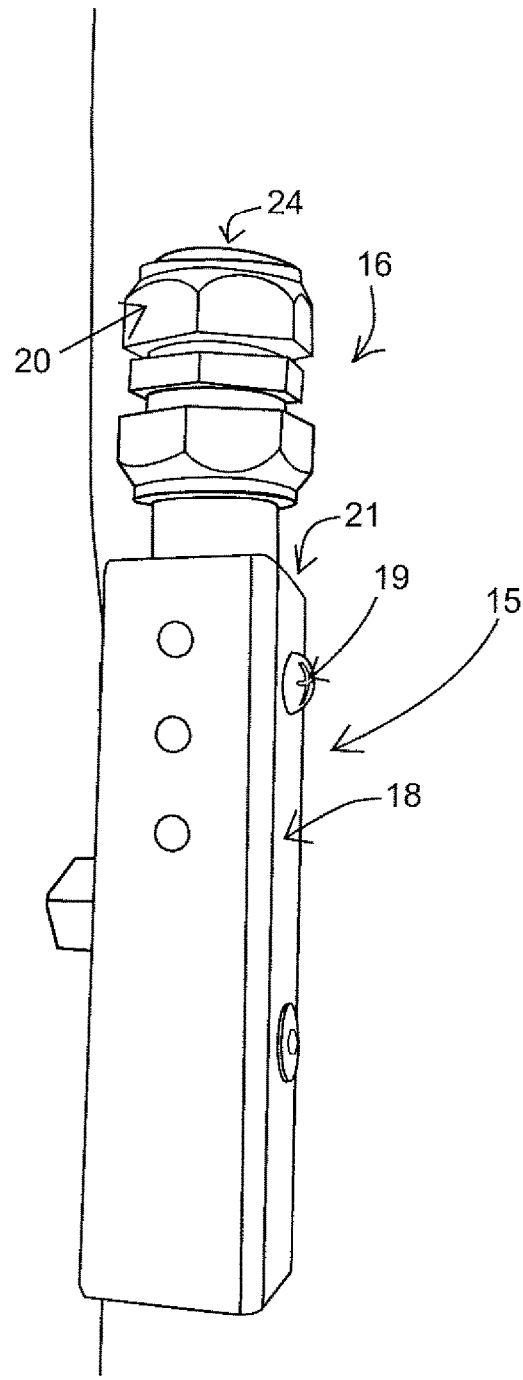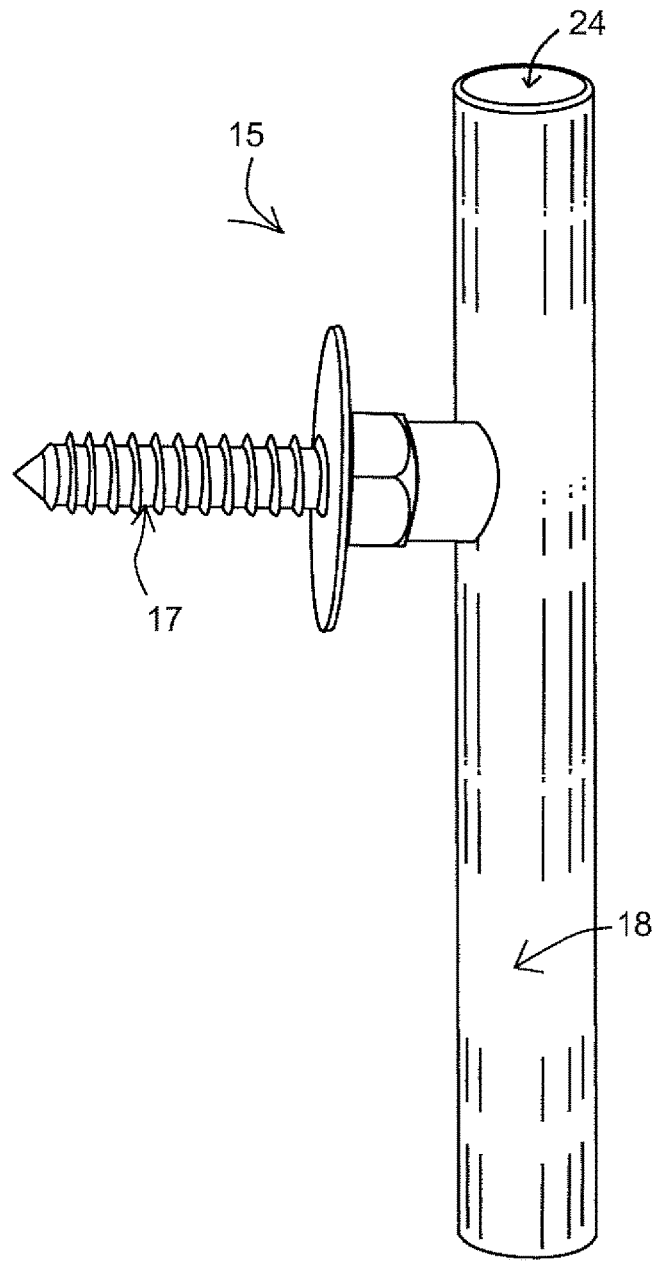
FIG. 6A  FIG. 6B

COLLAPSIBLE HUNTING BLIND

CROSS-REFERENCE TO RELATED APPLICATIONS

This application claims the benefit of and priority to U.S. Provisional Patent Application No. 62/770,347, filed Nov. 21, 2018 and entitled "Collapsible Hunting Blind," the entire contents of which are hereby incorporated by reference herein in their entirety.

FIELD OF INVENTION

The present disclosure pertains to the field of hunting blinds. More specifically, the present disclosure pertains a collapsible hunting blind system.

BACKGROUND

Hunters sometimes use hunting blinds to conceal themselves and prevent detection by game they are hunting. Game may live across a wide area, and in order to find it, hunters may hunt in various locations, even changing locations during a hunt from time to time. If a hunter wants use a blind in a location where one is not already installed, the hunter may use a portable blind. Because the hunter may move to different locations, the environment in which the blind is being used may change. Portable blinds can be cumbersome to transport and difficult to set, and may have limitations on how it can be adjusted to meet the hunter's needs in the new environment. Improved techniques for hunting blind systems are generally desirable.

SUMMARY OF THE INVENTION

The present disclosure describes a collapsible hunting blind. In a first exemplary embodiment, a collapsible hunting blind is provided and comprises a collapsible canopy, wherein the canopy is an umbrella comprising ribs, rib-stretchers and a shaft; a curtain, wherein the curtain comprises a plurality of camouflaging portions, a plurality of slits that extend from a top portion of the curtain to a bottom portion of the curtain and that define a plurality of side panels, wherein the curtain is configured to be draped over the canopy; a receiver, wherein the receiver comprises a threaded portion positioned essentially orthogonally to the receiver; an arm connectable to the receiver; a C-clamp connected to the arm, wherein the C-clamp has an adjustable screw, and wherein the C-clamp is rotatable with respect to the arm; and a brake bolt configured to restrict a range of motion of the C-clamp.

In a second exemplary embodiment, a collapsible hunting blind is provided and comprises a collapsible canopy having a shaft; a curtain, wherein the curtain comprises a plurality of camouflaging portions, wherein the curtain further comprises at least one slit that extends from a top portion of the curtain to a bottom portion of the curtain, and wherein the curtain is configured to be draped over the canopy; a receiver, wherein the receiver comprises a threaded portion positioned essentially orthogonally to the receiver; an arm connectable to the receiver; and an adjustable clamp connected to the arm configured to receive the shaft of the canopy.

In a third exemplary embodiment, a collapsible hunting blind is provided and comprises a collapsible canopy having a shaft; an arm having a first end and a second end; a clamp connected to the arm first end, wherein the clamp is configured to receive and secure the shaft of the canopy; and a curtain configured to be draped over the canopy.

BRIEF DESCRIPTION OF THE DRAWINGS

It should be noted that identical features in different drawings are shown with the same reference numeral (if applicable). Various other objects, features and attendant advantages of the present invention will become fully appreciated as the same becomes better understood when considered in conjunction with the accompanying drawings.

The following drawings are attached to and form a portion of this disclosure:

FIG. 6A: A side view of one embodiment of the receiver shown as screwed into a tree.

FIG. 6B: A side view of one embodiment of the receiver.

DEFINITIONS

Figure 1:
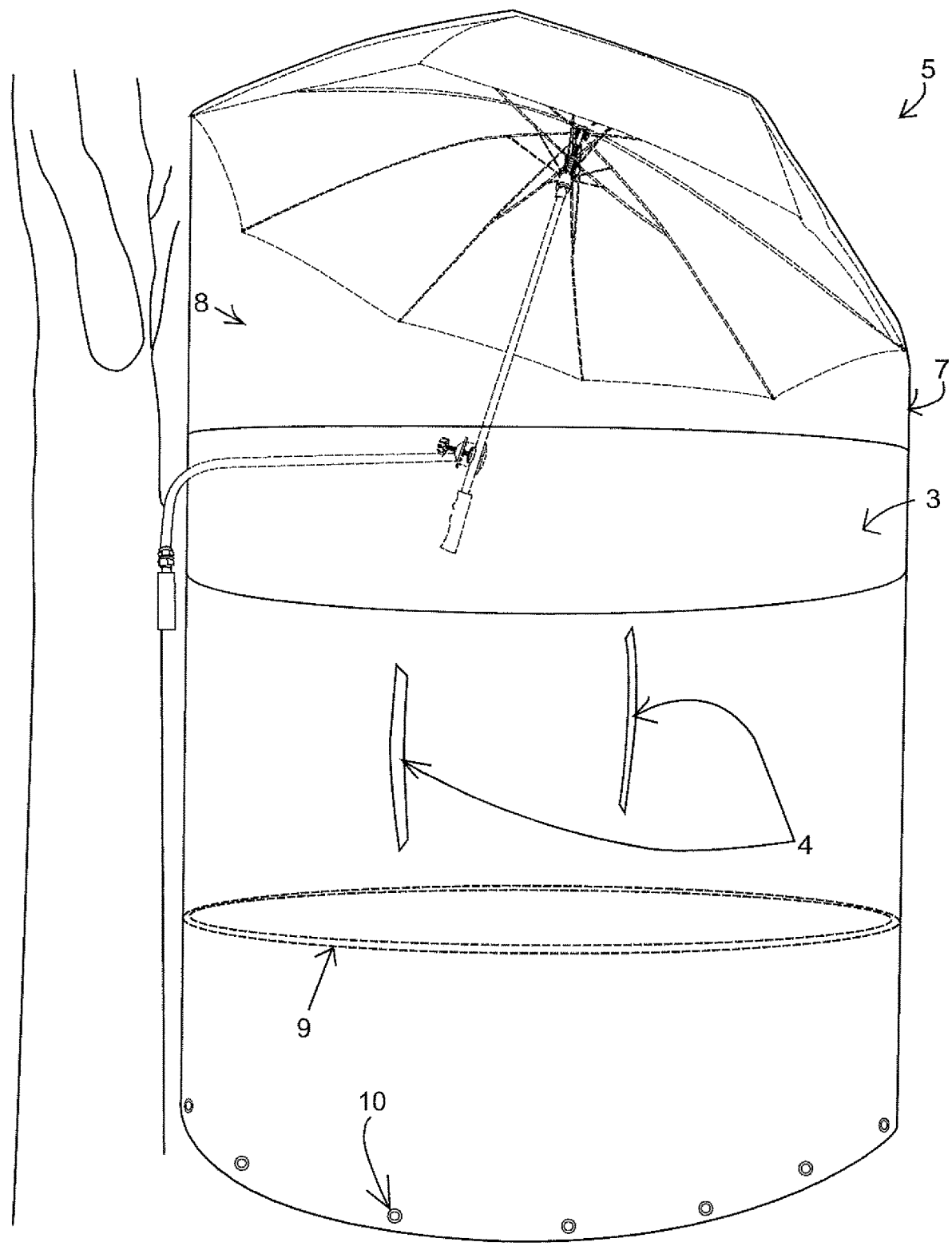
FIG. 1: A side view of one embodiment of the collapsible hunting blind system.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. Well known functions or constructions may not be described in detail for brevity or clarity.

The terms "about" and "approximately" shall generally mean an acceptable degree of error or variation for the quantity measured in light of the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a left could be a right, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

It should be noted that identical features in different drawings are shown with the same reference numeral (if applicable). Various other objects, features and attendant advantages of the present invention will become fully appreciated as the same becomes better understood when considered in conjunction with the accompanying drawings.

FIGS. 1-12 illustrate various views and embodiments of the present invention. FIGS. 1-12 depict various aspects of a collapsible hunting blind system in accordance with some embodiments of the present disclosure.

Various embodiments may have one or more of the components outlined below.

In contrast to existing hunting blinds, the collapsible blind system 5 attaches to a tree trunk and uses an umbrella 30 or similar collapsible canopy to support a lightweight camouflaging curtain 7 (also referred to herein as a "blind") draped over the umbrella 30. When the umbrella 30 is open, the camouflaging curtain 7 draped over it can form a volume (e.g., a room) within which a hunter can be positioned to wait for game to come within range. In some embodiments, the collapsible blind system 5 can be used without the curtain 7. For example in some embodiments, the collapsible blind system 5 attaches to a tree trunk and uses an umbrella 30 or similar collapsible canopy, but does not support a curtain. The hunter can close the umbrella 30 when the hunt is complete and easily disassemble and transport the system 5.

Figure 2:
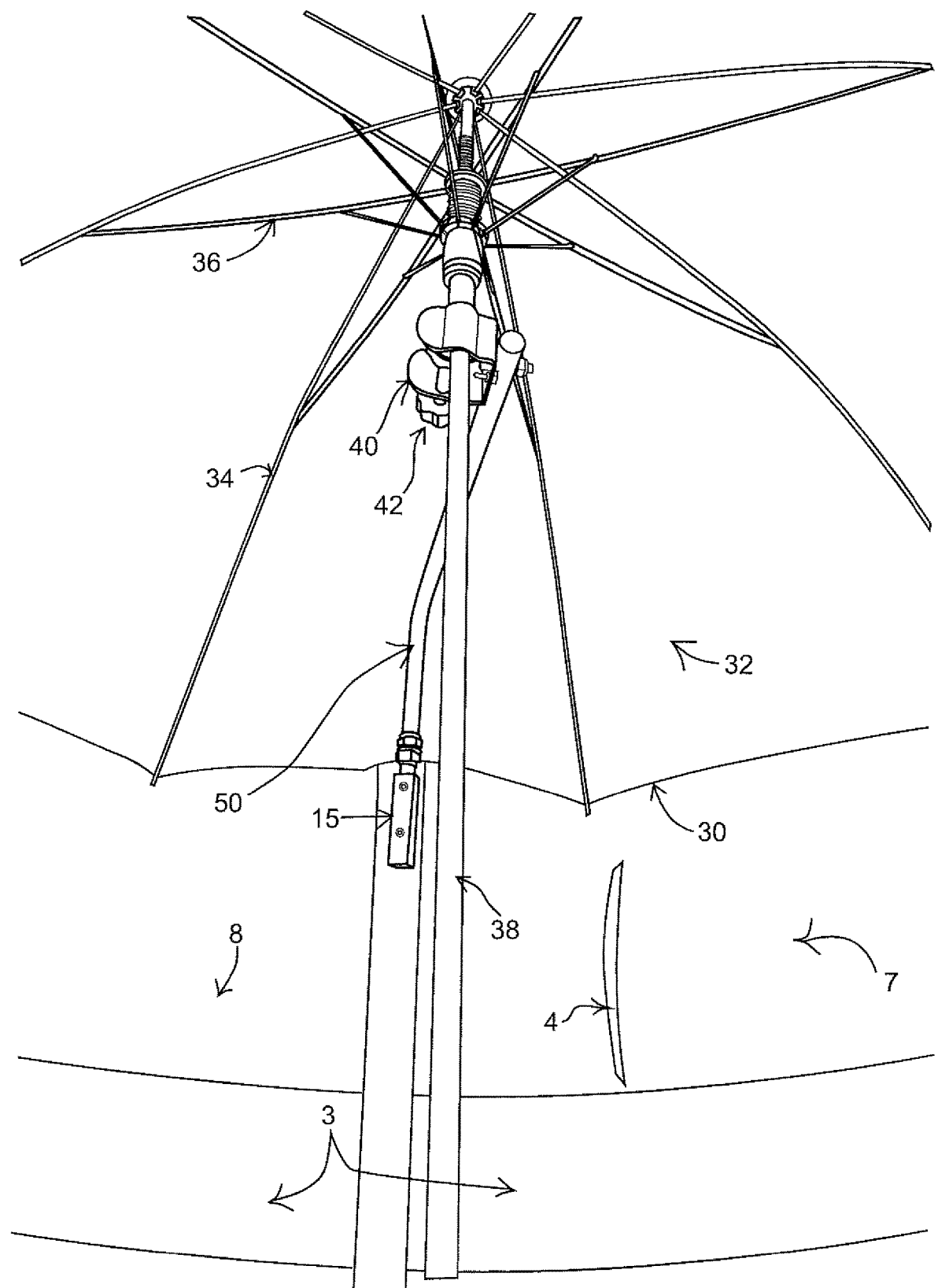
FIG. 2: A view of the embodiment of FIG. 1 from under the umbrella.

FIGS. 1-2 show blind system 5 in accordance with some embodiments of the present disclosure. The blind system 5 has been set up for use by the hunter. The system 5, when set up, may have a range of heights from the top of the umbrella 30 to the bottom of the camouflaging curtain 7; for example, between 10 feet and 5 feet, more preferably between 8 feet and 6 feet, and most preferably approximately 7 feet, but other heights are possible. The system 5 can be used by a hunter while in a tree stand or on the ground. The curtain 7 can have a plurality of camouflaging portions 8. The camouflaging portions 8 can have various dimensions, such as an approximately 12 inch height. The portions 8 can have various types of colors, textures, transparency, reflectiveness, luminosity, or otherwise. In some embodiments the camouflaging portions 8 can have a camouflage pattern selected based on a determination of a pattern that will best conceal a hunter in an environment in which the system 5 will be used.

The curtain 7 can have a plurality of windows 3 configured to allow a hunter to see out when positioned inside the curtain 7. The plurality of windows 3 can have various dimensions and may be made of various materials and sizes, but in some embodiments the windows 3 are a transparent mesh material and extend essentially continuously around the circumference of the curtain 7 to provide to the hunter a full range of visibility. In some embodiments, the curtain 7 can have two rows of windows 3 between camouflaging portions 8 to allow a hunter to see out from the curtain 7 when the hunter is in a standing or seated position with respect to the curtain 7.

The curtain 7 also can have a plurality of slits 4. In some embodiments the slits 4 may run along substantially the height of the curtain 7. In some embodiments, the slits 4 define one or more separate vertical side panels of the curtain 7. The curtain 7 can have various numbers of side panels in some embodiments, (e.g., approximately 8 separate panels or other number). The slits 4 can allow objects such as a weapon (e.g., firearm muzzles, bows, spears, etc.) or other objects to pass between the side panels and through the curtain 7. The hunter also can use one of the slits 4 that runs from a top portion to a bottom portion of the curtain 7 for ingress to and egress from the curtain 7.

In some embodiments, slits 4 may extend a portion of a height of the curtain 7, but not the entire height of the curtain 7. However, in some embodiments, at least one slit 4 may run essentially an entire height of the curtain 7 (from a bottom edge of the curtain 7 to a portion of the curtain 7 that contacts the umbrella 30). In an embodiment, such a slit 4 running the height of the curtain 7 may be positioned adjacent to the tree trunk to allow the receiver 15 and arm 50 to pass through the slit 4 when the hunter is setting up the curtain 7, as well as to allow the hunter to enter the curtain 7 adjacent to the tree (e.g., from behind the curtain 7). When the curtain 7 is positioned in a tree, the hunter also can enter the curtain 7 from beneath the curtain 7 where the curtain 7 is open to space below.

In some embodiments, each panel of the curtain 7 can have VELCRO® or hook-and-loop material on an edge portion of the panel that can be coupled to VELCRO® or hook-and-loop material on one or more adjacent panels of the curtain 7 (e.g., to prevent flapping of the panels during windy conditions which may expose the hunter). The VEL-CRO® or hook-and-loop material can allow the hunter to close or open each of the slits 4 as desired by attaching or detaching a first panel to a second panel adjacent to the first panel. In addition, the VELCRO® or hook-and-loop can be wrapped around the panel to allow the hunter to open a slit 4 wide enough to allow the hunter to shoot a large weapon (e.g., a bow and arrow) from within the curtain 7. It will be appreciated that adjacent panels can be coupled together using other techniques in other embodiments (e.g., buttons, snaps, zippers, ties, magnets, etc.). FIG. 2 also shows that the receiver 15 and arm 50 can pass through a slit 4 of the curtain 7. This may allow panels of the curtain 7 to drape around the receiver 15. The hunter can couple (e.g., VEL-CRO® or hook-and-loop) the panels together above and below the receiver 15 if desired.

In some embodiments, the curtain 7 may have a support (for example, as shown in FIG. 1, a hoop 9) configured to stabilize the curtain 7. In various embodiments, the hoop 9 could be made of various materials, for examples, rubber, plastic, wood, or metal. In some embodiments, the hoop 9 is one single piece; in other embodiments, the hoop 9 comprises multiple pieces that can be connected together by any suitable means. In some embodiments the hoop 9 is secured to the curtain 7 by any suitable means. In some embodiments, as shown in FIG. 1, the hoop 9 may be secured to the curtain 7 by a series of straps inside the curtain 7. In other embodiments, the hoop 9 may be secured to the curtain 7 through a sleeve.

Figure 11:
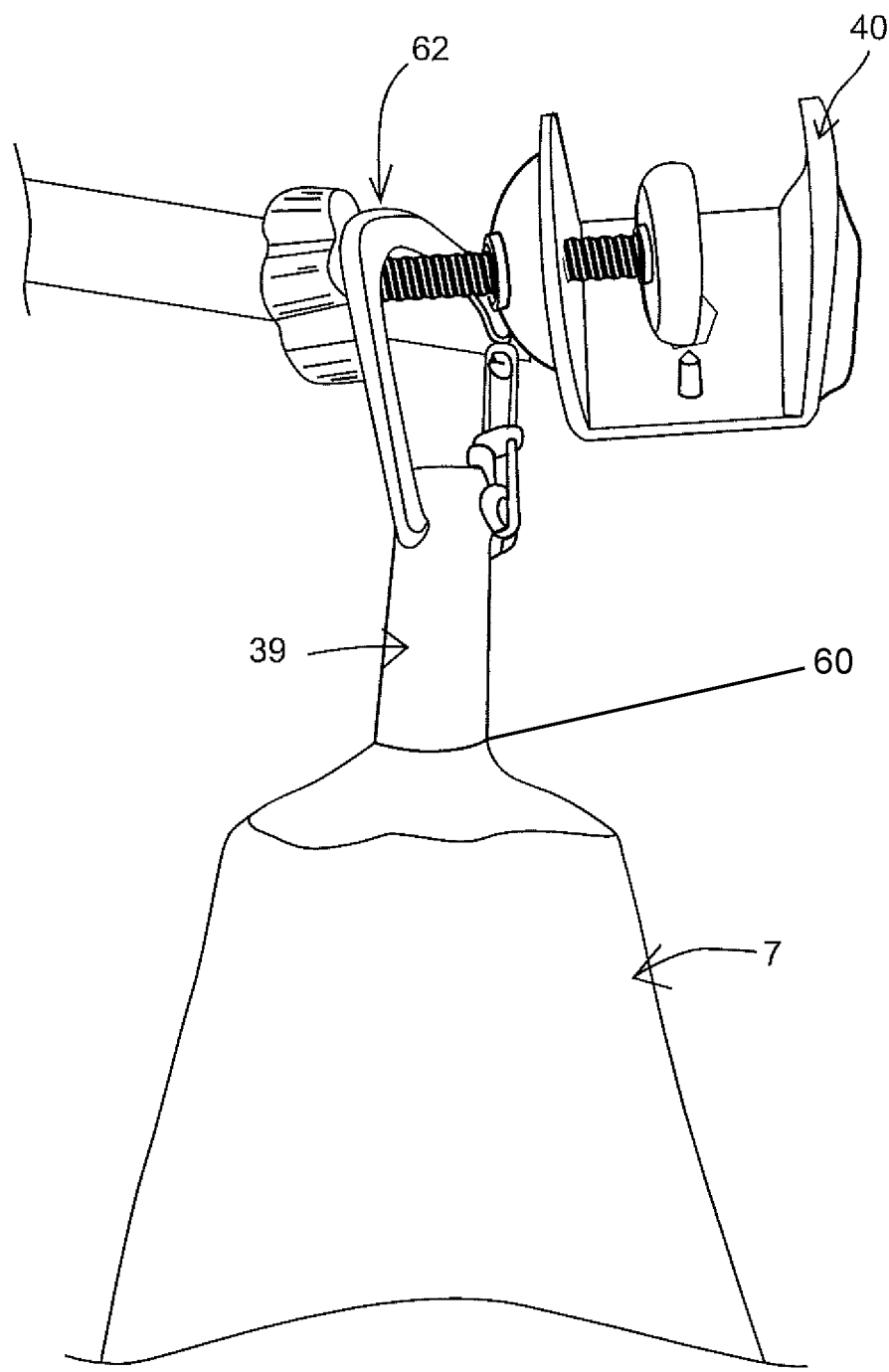
FIG. 11: A top perspective detail view of the embodiment of FIG. 1 with a hook supporting the canopy and curtain.
Figure 12:
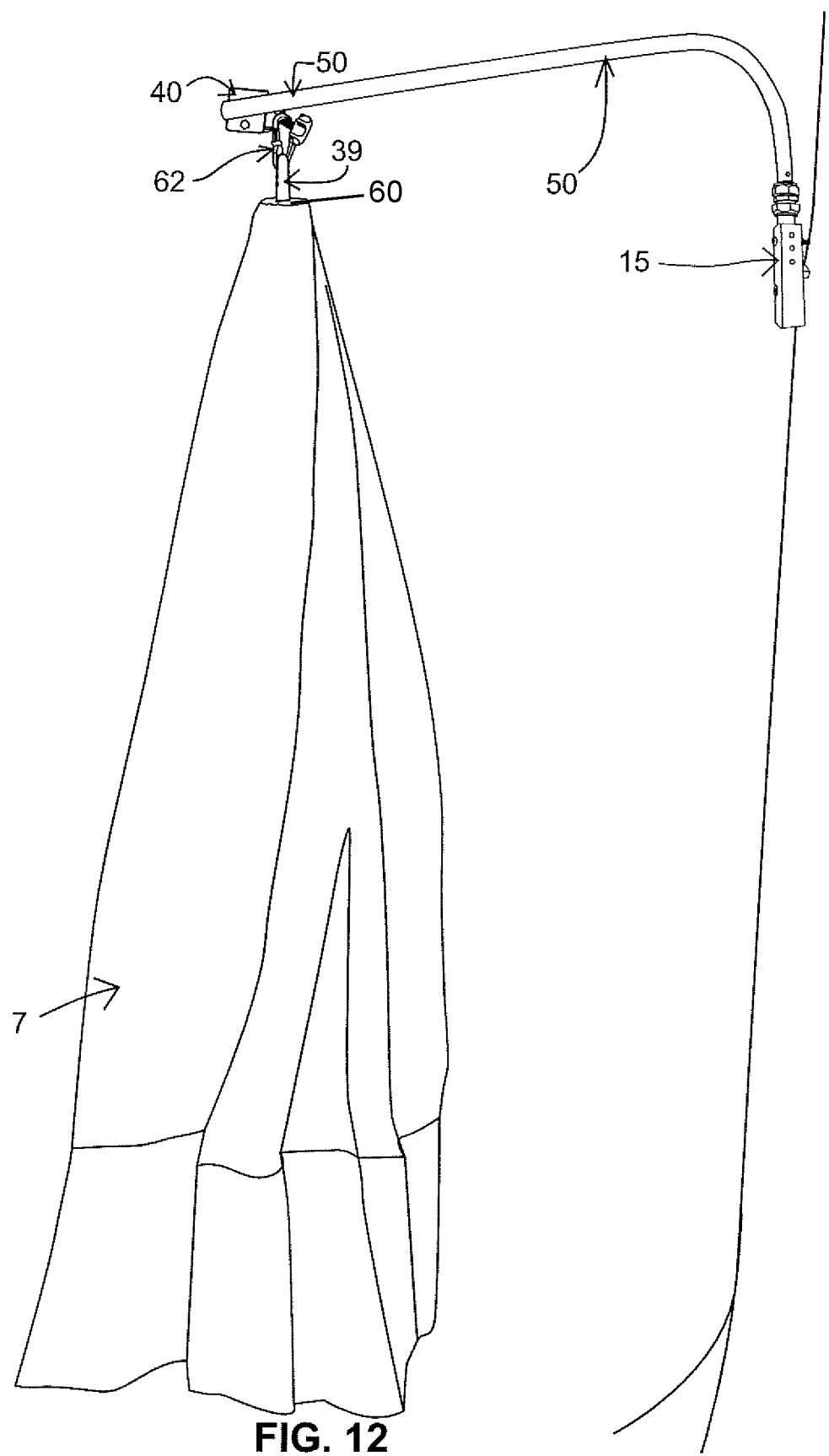
FIG. 12: A side view of the embodiment of FIG. 1 with a hook supporting the canopy and curtain.

Additional detail of some embodiments of the curtain 7 when not in use is shown in FIGS. 11-12.

FIG. 2 further illustrates a view from inside the curtain 7 while it is draped over an open umbrella 30. Ribs and rib-stretchers (e.g., exemplary rib 34 and exemplary rib-stretcher 36) support a covering material 32 of the umbrella 30. When the umbrella 30 is open, covering material 32 can support the curtain 7.

The shaft 38 of the umbrella 30 is positioned within clamp 40. The shaft 38 may have a range of lengths; for example between 1 foot and 5 feet, more preferably between 2 feet and 4 feet, and most preferably approximately 3 feet long. The clamp 40 is depicted as a "C-clamp," and is configured to hold the shaft 38 by use of a hand-adjustable screw 42. In some embodiments, the clamps 40 could be connected at any point along the shaft 38; compare, for example, the embodiment shown in FIG. 2 (wherein the clamp attaches proximate the top of the shaft) with the embodiment shown in FIG. 3 (wherein the clamp attaches proximate the bottom of the shaft). The hunter can tighten the screw 42 to engage the clamp 40 and can untighten the screw 42 to release the clamp 40. In some embodiments, clamp 40 can use other components to securely hold the shaft 38, such as a spring-loaded clamp or any other suitable clamp. In some embodiments, the clamp 40 is or includes a ball joint (or other spherical bearing) configured to receive the end of the shaft 38. In some embodiments the ball joint allows free range of motion around at least both the transverse axis and the longitudinal axis. In other embodiments, the clamp 40 is or includes other components that are configured to allow free range of motion. FIG. 2 also depicts the receiver 15 coupled to the tree trunk and arm 50 inserted into a portion of the receiver 15, described below.

Figure 3:
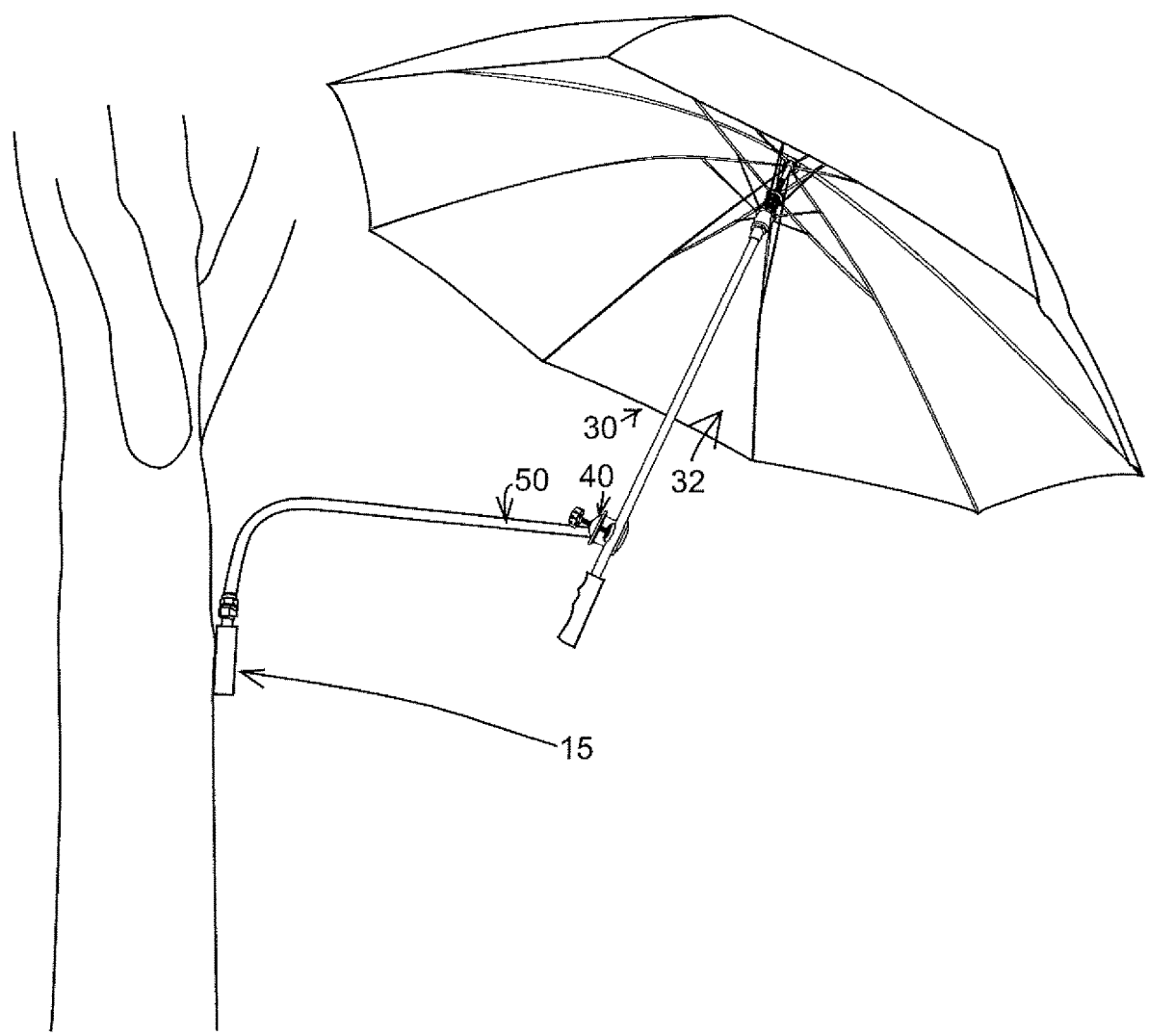
FIG. 3: A side view of one embodiment without the curtain.
Figure 4:
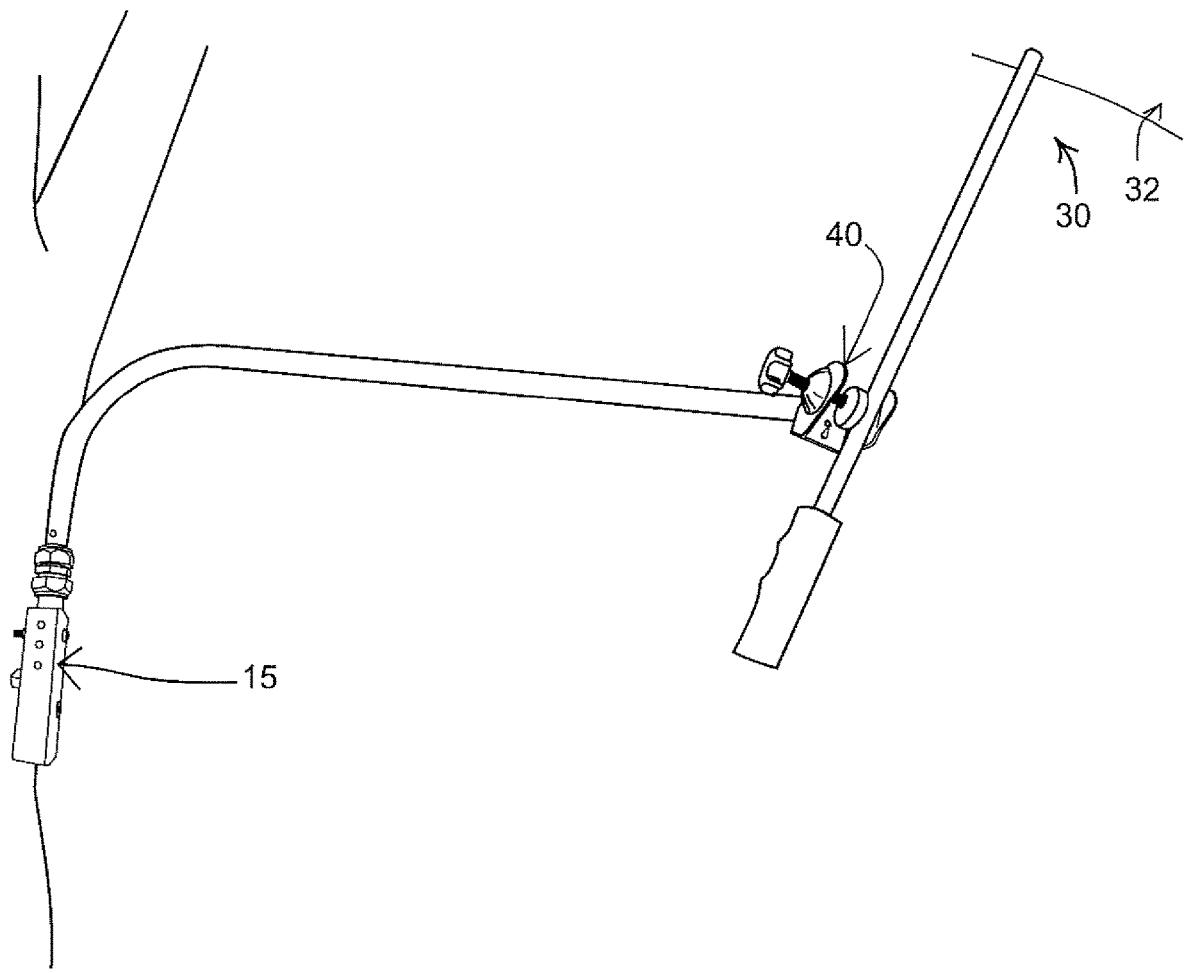
FIG. 4: A side detail view of the embodiment of FIG. 1, showing the arm, shaft, and receiver without the curtain.
Figure 5:
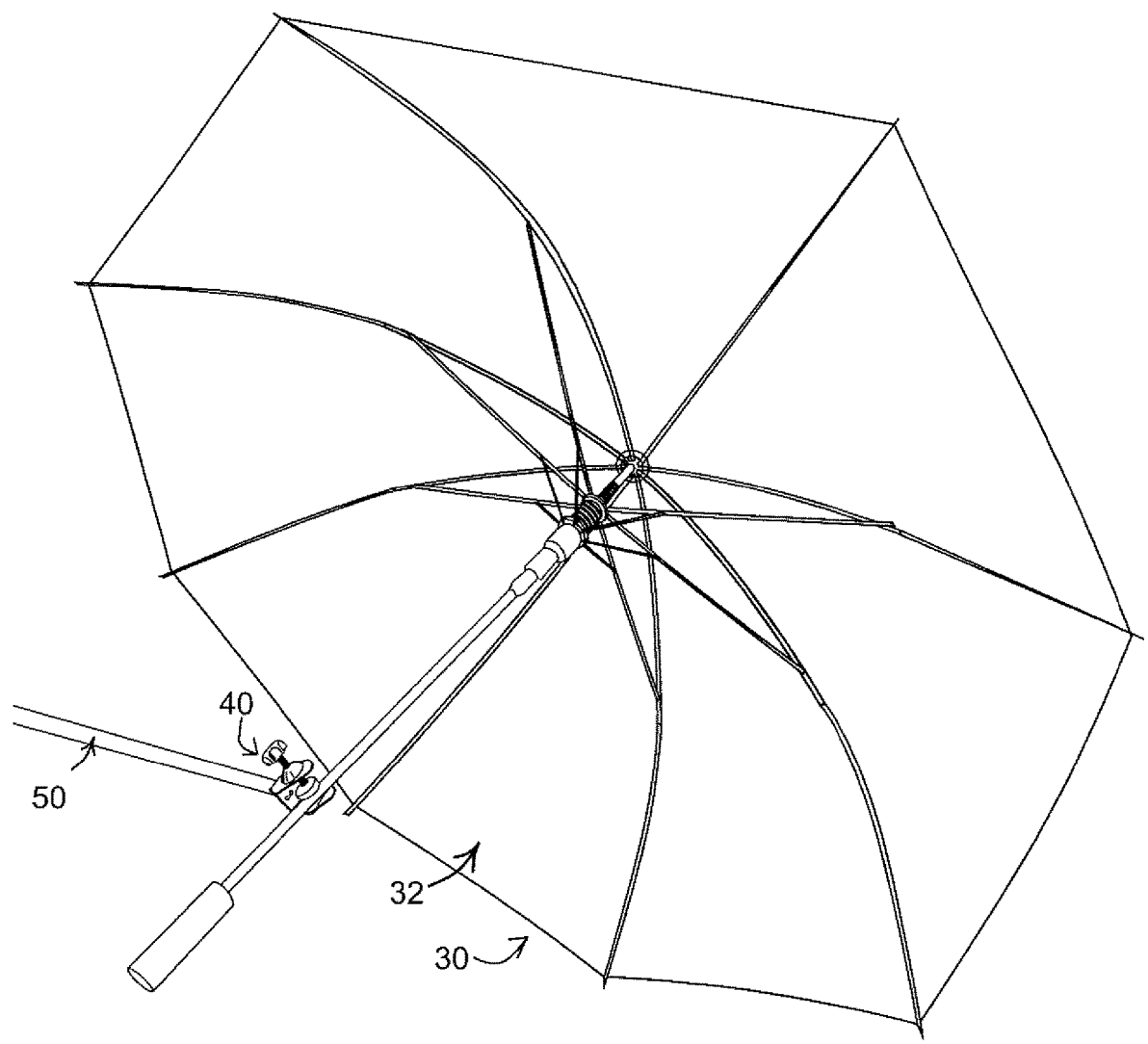
FIG. 5: A side-bottom detailed view of the embodiment of FIG. 1 without the curtain.

For additional detail, FIGS. 3-5 depict some embodiments of the receiver 15, umbrella 30, clamp 40, and arm 50 of system 5 in use, but with the curtain 7 removed for clarity. Note that the clamp 40 can be adjustable, for example rotated relative to the arm 50, thereby changing the position of the umbrella 30. In one embodiment, the clamp 40 pivots about a transverse axis of the arm 50 in order to allow the top of the umbrella 30 to rotate toward or away from the tree trunk. FIG. 5 shows the top of the umbrella 30 being rotated about the clamp 40 (e.g., away from the tree trunk). In some embodiments, the clamp 40 can be configured to rotate either clockwise or counterclockwise, and can have additional degrees of freedom to permit adjustment of a position of the umbrella 30 in one or more in additional directions in other embodiments.

Figure 7:
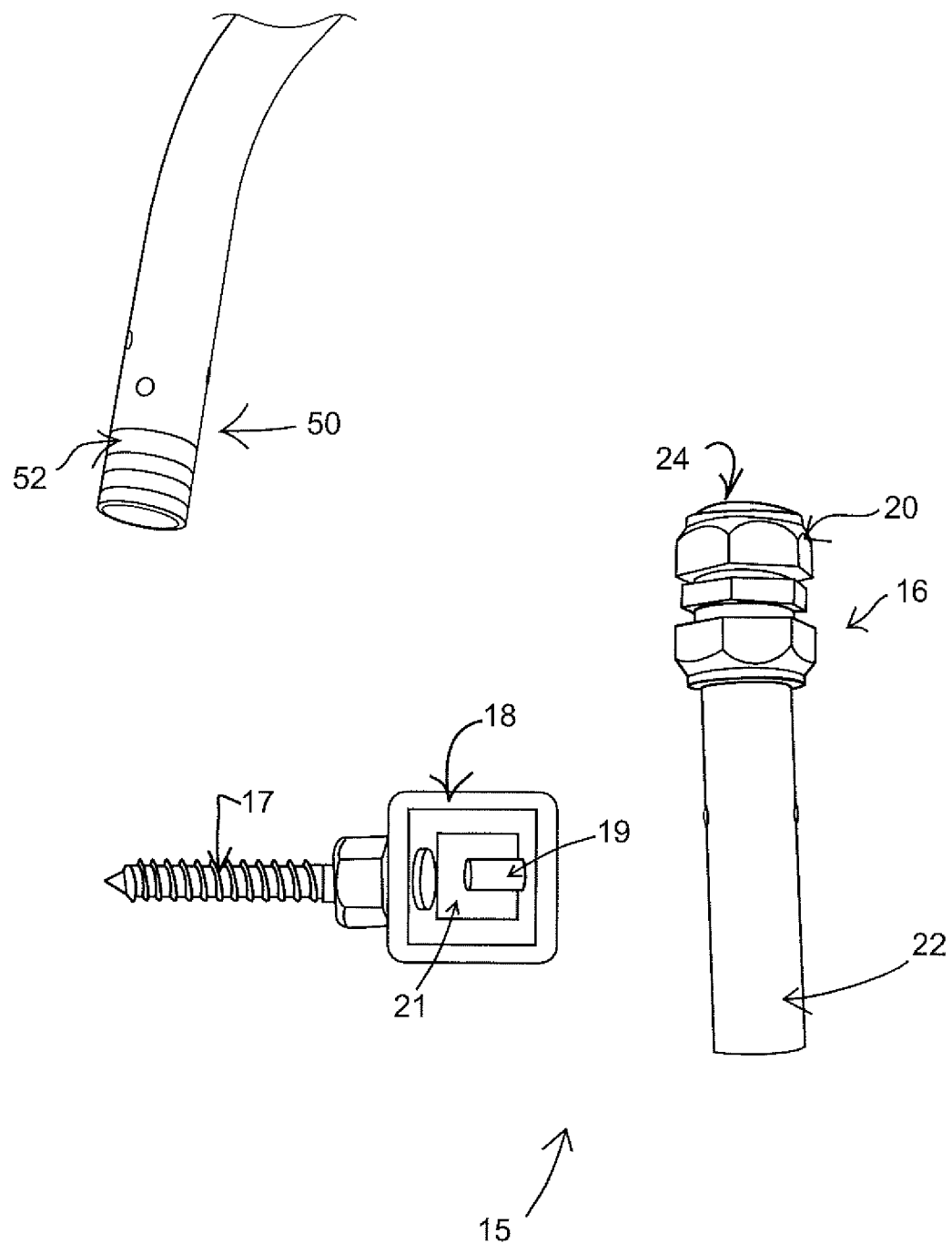
FIG. 7: An exploded view of one embodiment of the receiver and first end of the arm.

As shown in FIGS. 6A, 6B, and 7, the receiver 15 can be configured to couple to a tree trunk and to receive and support the arm 50. In some embodiments the receiver 15 can have a threaded portion 17 that can be screwed into the tree trunk at a desired location on the tree (e.g., a desired height, portion of the tree, etc.). In some embodiments, as shown for example in FIG. 6B, the threaded portion 17 may be welded directly onto the receiver. In some embodiments, the threaded portion 17 may be welded to a coupler which is welded to the receiver.

In other embodiments, as shown for example in FIG. 7, the threaded portion 17 may be positioned on a first side of the outer tube 18 that is oriented essentially orthogonally to a second side of the outer tube 18. It should be noted that a "tube" may have various cross-sections, including circular, rectangular, or other shapes. The receiver 15 also can have an outer tube 18 that is configured to hold an inner tube 16. A lower portion 22 of the inner tube 16 can be inserted into an aperture 21 on the second side of the outer tube 18. Other configurations are possible in other embodiments.

The outer tube 18 can have various shapes and attributes, but in some embodiments has an essentially square cross-section (as shown in FIG. 6A) and is made of a metal material (e.g., iron, steel, etc.). The inner tube 16 can also have various shapes and attributes, but in some embodiments, the inner tube 16 is configured to fit within the outer tube 18. The inner tube 16 can be made of various materials, but in some embodiments, the inner tube 16 is made from a metal material (e.g., steel conduit, etc.).

When the inner tube 16 is inserted into the outer tube 18, a pin 19 (e.g., a screw, bolt, etc.) can be inserted through at least one hole of the outer tube 18 and at least one hole of the inner tube 16 to couple the inner tube 16 to the outer tube 18. Outer tube 18 and inner tube 16 can each have various numbers of holes for receiving one or more pins 19 in other embodiments, such as to permit adjustment of the inner tube 16 within the outer tube 18. In other embodiments, when the inner tube 16 is inserted into the outer tube 18, a thumb screw or set screw can be inserted through at least one hole of the outer tube 18 to couple the inner tube 16 to the outer tube 18 by tightening the end of the thumb screw against the inner tube 16.

Further, the inner tube 16 can have an opening 24 for receiving a first end 52 of arm 50. The opening 24 can have a cross-sectional shape that is similar to that of the arm 50, such as an essentially circular cross-section or otherwise. The inner tube 16 can have a compression nut 20 that can be adjusted (e.g., tightened or loosened) to apply pressure to the first end 52 of arm 50. The compression nut 20 can be tightened to secure the arm 50 when the first end 52 is inserted into the inner tube 16, and can be loosened to release the arm 50. The compression nut 20 can be adjusted by using a tool (e.g., a wrench), by hand tightening, or otherwise. In addition, a position of the arm 50 relative to the receiver 15 can be fixed by tightening the compression nut 20 sufficiently. The arm 50 can be secured and coupled to the receiver 15 by other means in other embodiments.

In some embodiments, an additional pin, bolt, or other stabilizer support (not specifically shown) can be inserted through a lower portion of the outer tube 18 (e.g., at a position that is below the threaded portion 17 and aperture 21) and can be configured to have an adjustable length (e.g., by rotating the pin) sufficient to allow it to contact the tree trunk when the receiver 15 is screwed into the trunk. This additional pin, bolt, or other stabilizer support can provide additional support to the receiver 15. For example, the receiver 15 may experience a force (e.g., a moment force about a location at which the threaded portion 17 is inserted into the tree trunk) when the arm 50 is inserted into the receiver 15 and clamp 40 is holding umbrella 30. The lower portion of the outer tube 18 may experience this force, which may be directed toward the tree trunk. In this regard, the additional bolt, pin, or other stabilizer support can provide additional stability by contacting the trunk to brace the receiver 15 against the force.

In other embodiments, an appendage of the threaded portion 17 itself can help to counter the moment force. In some embodiments, as shown for example in FIG. 6B, a metal disk around the threaded portion 17 can help to counter the moment force and act as a stabilizer support.

In some embodiments, the receiver 15 can be secured to the tree by other means. For example, in some embodiments, the receiver 15 can be secured to the tree by straps. In some embodiments, the straps could be tightened by a ratchet buckle assembly. In other embodiments the receiver can be secured to the tree by hooks, clamps, or any other suitable attachment mechanism.

Figure 8:
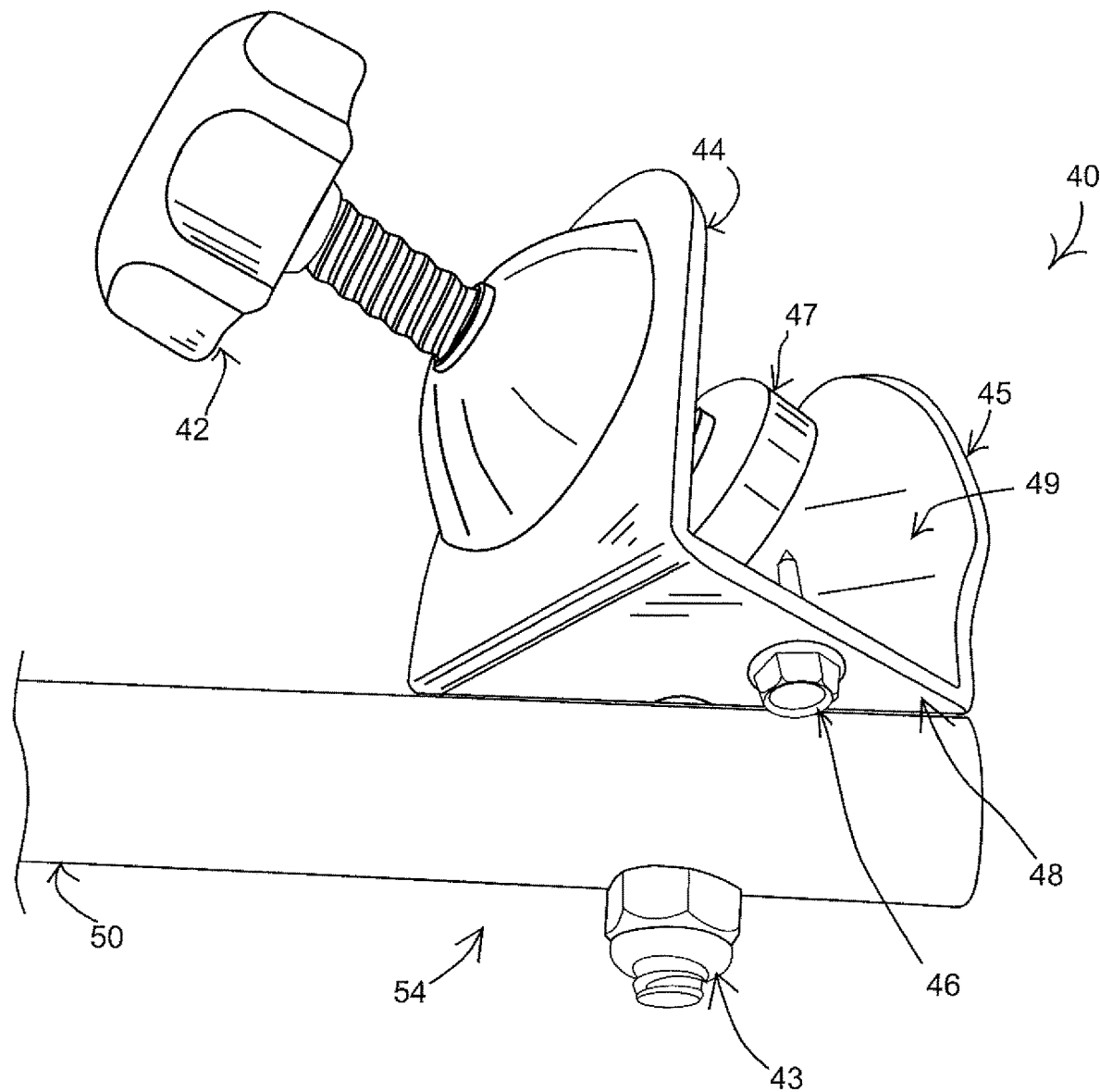
FIG. 8: A perspective detail view of one embodiment of the arm and clamp.
Figure 9:
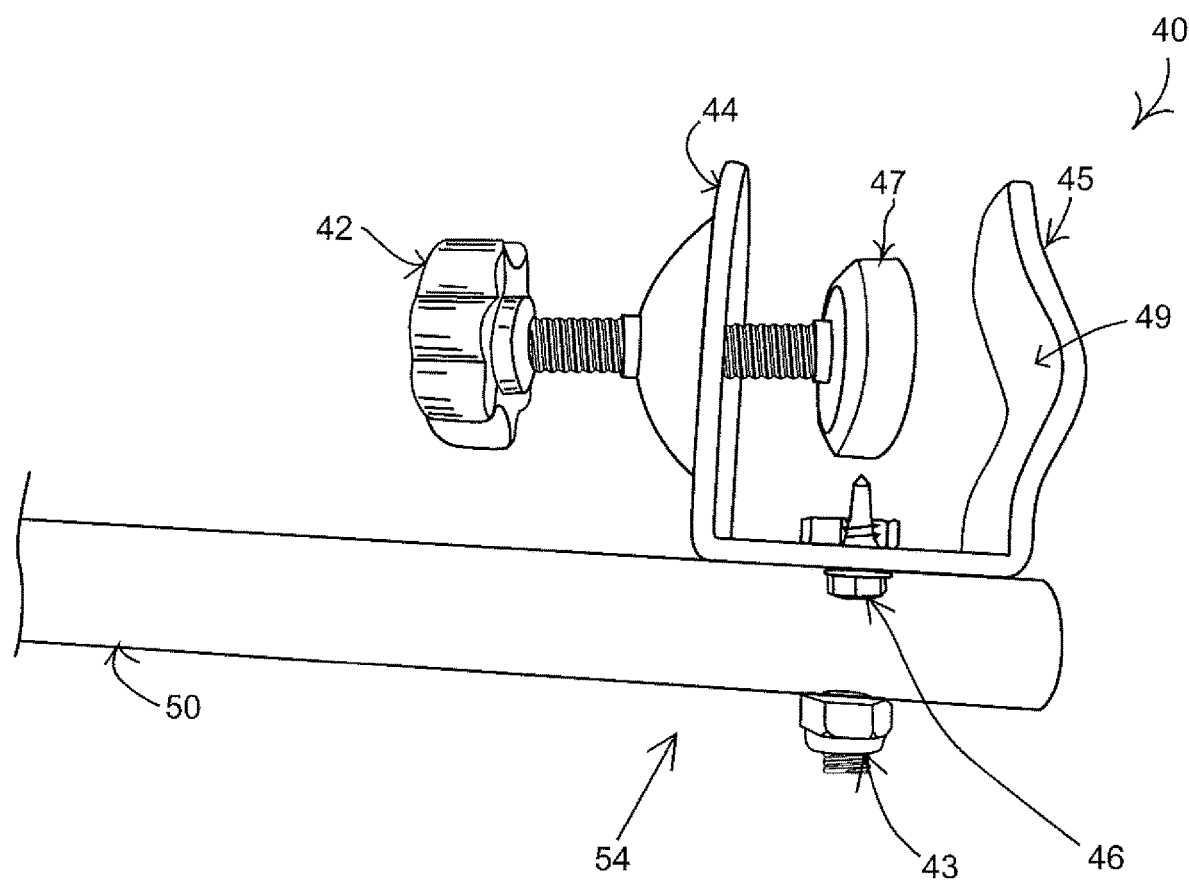
FIG. 9: A side detail view of one embodiment of the arm and clamp.
Figure 10:
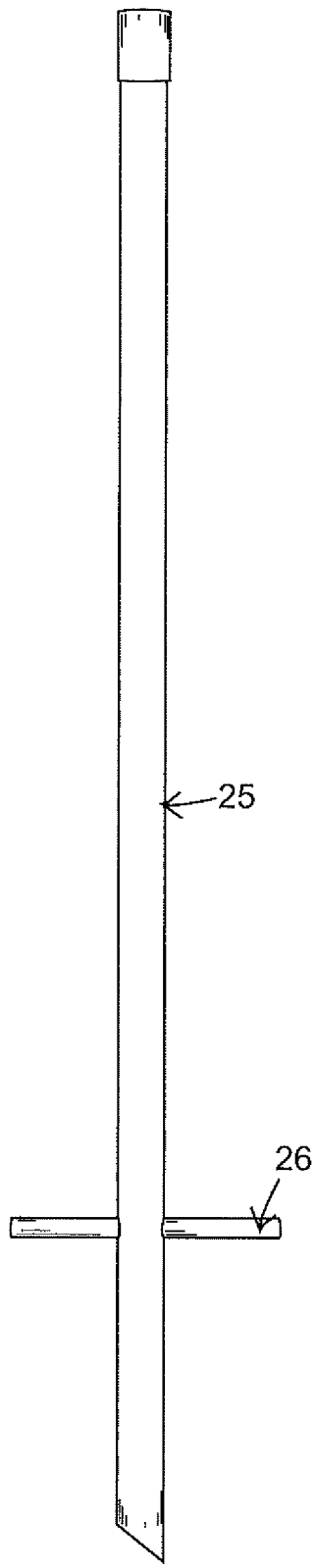
FIG. 10: A side view of one embodiment the stakepole.

FIGS. 8-9 show additional views of the arm 50 and clamp 40. The clamp 40 can be coupled to a second end 54 of the arm 50 by a bolt 43. The clamp 40 can have a first plate 44 and second plate 45 positioned opposite from one another. Shaft 38 of umbrella 30 can pass between the first plate 44 and second plate 45 and can be secured to the clamp 40 when the hunter tightens hand-adjustable screw 42. That is, a portion of hand-adjustable screw 42 can extend toward second plate 45 when the screw 42 is tightened (e.g., turned in a first direction), and retract toward first plate 44 when the screw is loosened (e.g., turned in a second direction). Hand-adjustable screw 42 can be configured to pass through a hole in plate 44 and make contact with the shaft 38 when it is between first plate 44 and second plate 45. In some embodiments, as shown for example in FIG. 9, either the first plate 44 or the second plate 45 or both can have a curved face 49 to better accommodate and secure the shaft. The screw 42 can have a pad 47 (e.g., rubberized or plastic wafer, etc.) on an end of the screw 42 between the first plate 44 and second plate 45. The pad 47 can contact and secure the shaft 38 when the screw 42 is tightened sufficiently. In some embodiments the pad 47 can have a curved face to better accommodate and secure the shaft (like the curved face 49 shown in the second plate 45).

Bolt 43 can be secured using one or more nuts and can be configured to allow the clamp 40 to rotate or pivot about the bolt 43 in order to achieve rotation of the clamp 40 as described herein. A brake bolt 46 can be coupled to a bottom face 48 of the clamp 40 and configured to restrict a range of rotation of the clamp 40. When the clamp 40 pivots about the bolt 43, brake bolt 46 can restrict the range of rotation of the clamp 40 by making contact with a surface of the arm 50 and stopping further rotation of the clamp 40 about the bolt 43. FIG. 9 shows the clamp 40 in a first position in which the brake bolt 46 is not in contact with the arm 50. The clamp 40 is thus free to continue to rotate clockwise about the bolt 43 until the clamp 40 reaches a second position in which the brake bolt 46 is in contact with the arm 50, as shown, for example, by FIG. 8. Ranges of motion of the clamp 40 can be controlled using other techniques in other embodiments. The brake bolt 46, or other similar mechanism, can also be used to control or restrict movement of the umbrella 30 within the clamp 40.

As shown by FIGS. 11-12, curtain 7 can be configured to fit over an outer surface of the umbrella 30 or other canopy. Curtain 7 can have a hole 60 through which a tip or finial top 39 of the umbrella 30 can pass in order to maintain position of the curtain 7 with respect to the umbrella 30 while the system 5 is in use. FIG. 11 shows a hook 62, which can pass through a hole in the finial top 39. The hook 62 can be used to hang the umbrella 30 (and curtain 7 when it is draped over the umbrella 30) if desired, such as when the umbrella 30 is closed. In an embodiment, the hook 62 can be configured to hook onto the arm 50 or clamp 40 to support the umbrella 30 and curtain 7 when not in use, as shown in FIG. 12. The hook 62 of FIGS. 11-12 is depicted as a carabiner, but other types of hooks are possible in other embodiments.

Note also that the curtain 7 can have additional features that are not explicitly shown. In some embodiments, a lower portion of the curtain 7 can have one or more grommets 10 (shown in FIG. 1) that are configured to allow a hunter to secure the lower portion of the curtain 7 to the ground or another surface, such as by placing stakes or rods through the grommets 10 and into the ground or other surface. In an embodiment, the one or more grommets 10 may have a configuration and spacing (e.g., about 20" apart or other distance) that will keep the curtain 7 essentially symmetrical at the lower portion. In this regard, a hunter may have ample room within the curtain 7 while hunting turkeys or other game for which the hunter should be positioned on the ground.

A hunter may assemble, use, and disassemble some embodiments of the system 5.

A hunter can quickly install the system 5 at a desired location. The hunter can screw a lightweight receiver 15 into a tree trunk, such as by hand or by using a tool (e.g., drill or other tool). The receiver 15 can receive and support a lightweight arm 50 while allowing it to rotate radially around the receiver 15. The hunter can drape the curtain 7 over the umbrella 30 (or other canopy) and couple the umbrella 30 to a rotatable clamp 40 that is coupled to the arm 50. The clamp 40 holds a shaft 38 of the umbrella 30 securely using a hand-adjustable screw 42.

A hunter can adjust a position of the curtain 7 by adjusting a position of the umbrella 30, such as from a first position to a second position. The umbrella 30 can be tilted to block sunlight and provide shade for the hunter and to allow the hunter to level the curtain 7 when the system 5 is used on a tree or other surface that is not level or vertical. In this regard, the hunter can adjust a tilt and angle of the umbrella 30 relative to the arm 50 by rotating the clamp 40 about the arm 50. The hunter also can adjust the height of the umbrella 30 relative to the arm 50 by releasing the clamp 40 (e.g., screw 42) and sliding the umbrella's 30 shaft up or down within the clamp 40, then tightening the clamp 40 (e.g., screw 42). The hunter can swivel the arm 50 about the receiver 15 in order to position the umbrella 30 and curtain 7 in a desired position. In addition, the hunter can rotate receiver 15 about the threaded portion 17 to adjust the position of the arm 50 and umbrella 30 as desired (e.g., such as when a tree to which the receiver 15 is coupled is crooked).

When the hunter wants to move the blind system 5 to another location, the hunter can disassemble the system 5 and carry it there. While the curtain 7 is still draped over the umbrella 30, the hunter can exit the curtain 7 and reach through a slit 4 in the curtain 7 to release the clamp 40 and remove the umbrella 30 shaft from the clamp 40. The hunter can close the umbrella 30, and can fold or roll the curtain 7 over the closed umbrella 30 and secure it, if desired. The hunter can remove the arm 50 from the receiver 15, and can unscrew the receiver 15 from the tree trunk. The hunter can take the system 5 to the next location where the hunter wishes to wait for game and set up the blind system 5 there using similar techniques.

In an alternate embodiment, rather than using a receiver 15 and arm 50 to support the umbrella 30 and curtain 7, the blind system 5 can have a stakepole 25 (shown in FIG. 10) (e.g., a man-portable pole) with a clamp 40 mounted on a first end at the top (not shown), but attached in a similar fashion as described above and as shown in FIGS. 8 and 9, and a pointed second end that can be inserted into the ground (e.g., as with a stake). In this context, such a stakepole 25 can be considered an "arm" (like the arm 50) simply oriented in the vertical direction. The stakepole 25 can have an optionally removable horizontal bar 26 near the second end configured to allow a hunter to insert the stakepole 25 into the ground by applying pressure with the hunter's foot. The clamp 40 on the first end of the stakepole 25 can be configured to hold an umbrella 30 (and curtain 7) in a manner similar to the other embodiments of the system 5 described herein. In this regard, such an embodiment may allow a hunter to use the system 5 in an open field or in an area where there are no suitable trees for mounting the receiver 15 as in other embodiments.

Although particular embodiments of the present disclosure have been described, it is not intended that such references be construed as limitations upon the scope of this disclosure except as set forth in the claims.

What is claimed is:

1. A collapsible hunting blind system comprising:
   (a) a collapsible canopy, wherein the canopy is an umbrella comprising ribs, rib-stretchers and a shaft;
   (b) a curtain, wherein the curtain comprises a plurality of camouflaging portions, a plurality of slits that extend from a top portion of the curtain to a bottom portion of the curtain and that define a plurality of side panels, wherein the curtain is configured to be draped over the canopy;
   (c) a receiver, wherein the receiver comprises a threaded portion positioned essentially orthogonally to a side of the receiver;
   (d) an arm connectable to the receiver;
   (e) a C-clamp connected to the arm, wherein the C-clamp has an adjustable screw, and wherein the C-clamp is rotatable with respect to the arm; and
   (f) a brake bolt configured to restrict a range of motion of the C-clamp.

2. The collapsible hunting blind system of claim 1, further comprising an inner tube having a first end configured to be positioned in the receiver and a second end configured to connect to the arm, wherein the receiver has an essentially square cross-section, wherein the receiver is made of metal, wherein the inner tube is made of metal, and wherein the receiver and inner tube have one or more holes to receive a pin configured to couple the receiver to the inner tube.

3. The collapsible hunting blind system of claim 1, further comprising a stabilizer support on the receiver.

4. The collapsible hunting blind system of claim 3, wherein the curtain further comprises a plurality of windows, wherein the windows are made of a transparent mesh material and extend continuously around a circumference of the curtain.

5. The collapsible hunting blind system of claim 4, wherein the number of side panels is approximately 8, and wherein the slits extend essentially the entire height of the curtain from proximate a bottom edge of the curtain to a portion of the curtain that contacts the canopy.

6. The collapsible hunting blind system of claim 5, further comprising fastening means for removably attaching each panel to an adjacent panel, wherein each fastening means is a hook-and-loop material.

7. The collapsible hunting blind system of claim 6, further comprising a blind support configured to be received around at least a portion of the circumference of the interior of the curtain.

8. The collapsible hunting blind system of claim 7, wherein the curtain further comprises a hole such that a tip of the canopy will fit through the curtain hole.

9. The collapsible hunting blind system of claim 8, wherein the canopy has a finial top having a hole.

10. A collapsible hunting blind system comprising:
    (a) a collapsible canopy having a shaft;
    (b) a curtain, wherein the curtain comprises a plurality of camouflaging portions, wherein the curtain further comprises at least one slit that extends from a top portion of the curtain to a bottom portion of the curtain, and wherein the curtain is configured to be draped over the canopy, and wherein the curtain further comprises a plurality of windows, and wherein the curtain comprises a plurality of panels;
    (c) a receiver, wherein the receiver comprises a threaded portion positioned essentially orthogonally to a side of the receiver;
    (d) an arm connectable to the receiver;
    (e) an adjustable clamp connected to the arm configured to receive the shaft of the canopy, wherein the clamp comprises at least one curved face configured to receive the shaft of the canopy; and
    (f) fastening means for removably attaching each panel to an adjacent panel.

11. The collapsible hunting blind system of claim 10, wherein the clamp is rotatable with respect to the arm.

12. The collapsible hunting blind system of claim 11, wherein the curtain further comprises a hole configured such that a tip of the canopy will fit through the hole.

13. The collapsible hunting blind system of claim 12, wherein the canopy has a finial top having a hole.

\* \* \* \* \*